United States Patent [19]

Yoshida et al.

[11] Patent Number: 5,566,008
[45] Date of Patent: Oct. 15, 1996

[54] POLYMER DISPERSED LIQUID CRYSTAL DISPLAY DEVICE MANUFACTURED BY AN OBLIQUE LIGHT IRRADIATION METHOD

[75] Inventors: Hidefumi Yoshida; Kazutaka Hanaoka; Kimiaki Nakamura; Hideaki Tsuda; Yasuo Yamagishi; Shin Eguchi, all of Kawasaki, Japan

[73] Assignee: Fujitsu Limited, Kawasaki, Japan

[21] Appl. No.: 61,052

[22] Filed: May 14, 1993

[30] Foreign Application Priority Data

May 15, 1992 [JP] Japan ................................. 4-122378
Feb. 12, 1993 [JP] Japan ................................. 5-024425

[51] Int. Cl.$^6$ ................. G02F 1/1333; G02F 1/1339
[52] U.S. Cl. ................................. 359/51; 359/80
[58] Field of Search ................ 359/51, 52, 80, 359/66

[56] References Cited

U.S. PATENT DOCUMENTS 4,494,825  1/1985  Sasaki et al. ........................ 350/343
5,178,571  1/1993  Mase ..................................... 445/24
5,208,687  5/1993  Yoshida et al. ....................... 359/61
5,249,071  9/1993  Yoshimizu et al. .................. 359/63
5,289,300  2/1994  Yamazaki et al. ................... 359/51
5,299,289  3/1994  Omae et al. .......................... 359/95

*Primary Examiner*—William L. Sikes
*Assistant Examiner*—Charles Miller
*Attorney, Agent, or Firm*—Staas & Halsey

[57] ABSTRACT

A polymer dispersed liquid crystal display device having a liquid crystal layer inserted between opposed glass plates and comprising a layer of resin and liquid crystal capsules dispersed in the resin. The liquid crystal capsules are substantially uniformly distributed all over the liquid crystal panel, even if a black matrix and bus lines provided in the glass plates may act as a shading layer when an ultraviolet light is irradiated to cure the resin and to form the liquid crystal capsules. The uniformly distributed liquid crystal capsules can be obtained by the manufacturing method comprising the step of irradiating the ultraviolet light obliquely to a surface of the glass plate having the shading layer for curing the resin material.

17 Claims, 13 Drawing Sheets

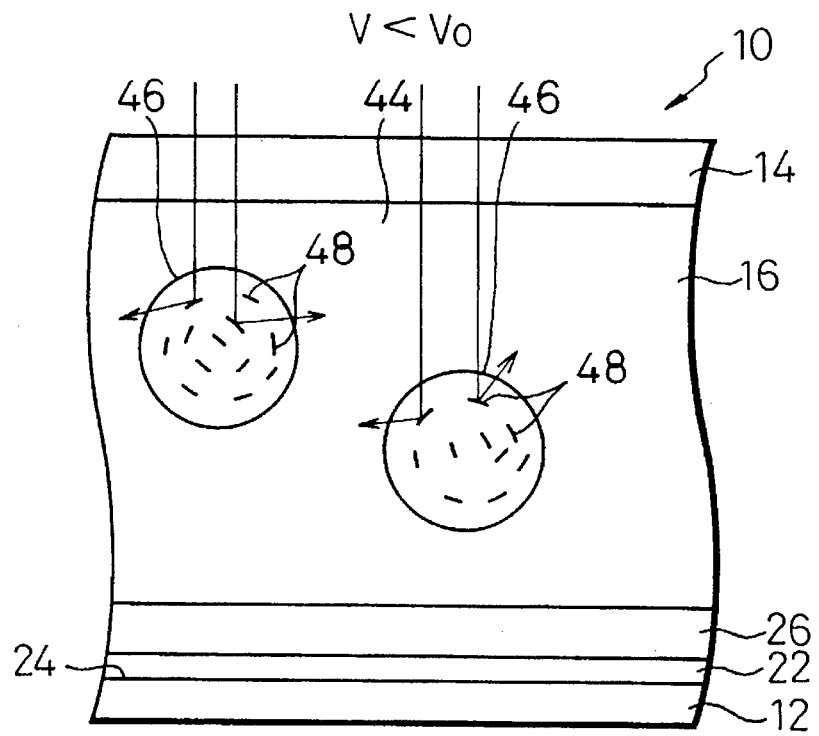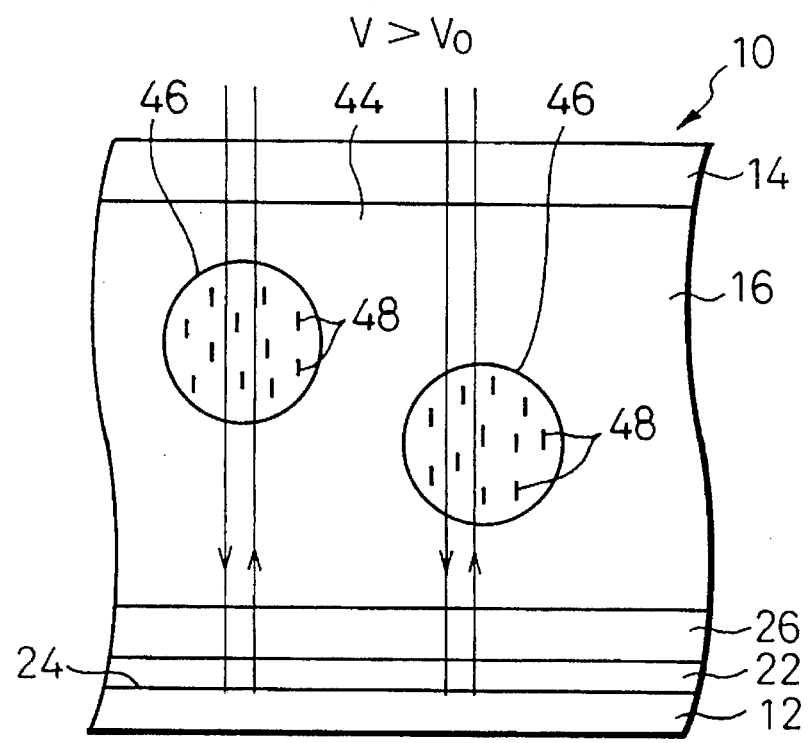

VIEWED FROM N DIRECTION

VIEWED FROM P DIRECTION

VIEWED FROM Q DIRECTION

5,566,008

POLYMER DISPERSED LIQUID CRYSTAL DISPLAY DEVICE MANUFACTURED BY AN OBLIQUE LIGHT IRRADIATION METHOD

BACKGROUND OF THE INVENTION

1. Field of the Invention

The present invention relates to a polymer dispersed liquid crystal display device having randomly distributed liquid crystal molecules which cause incident light to be scattered.

2. Description of the Related Art

A liquid crystal display device comprises a liquid crystal inserted between a pair of plates having electrodes. The liquid crystal is generally used so that liquid crystal molecules are aligned in a predetermined direction. In a twisted nematic type liquid crystal display device, for example, a pair of plates which carry the liquid crystal therebetween are rubbed in directions perpendicular to each other, and thus liquid crystal molecules are aligned along the rubbing directions of the respective plates. In contrast, there is a polymer dispersed liquid crystal display device having randomly distributed liquid crystal molecules.

In a twisted nematic type liquid crystal display device, it is known that a contrast of a picture is reduced when the display is viewed from a specified viewing angle relating to the orientating direction of the liquid crystal molecules, since the liquid crystal molecules are aligned in the predetermined direction.

In a polymer dispersed liquid crystal display device, the liquid crystal layer comprises liquid crystal capsules dispersed in the resin. The liquid crystal capsules are small grains of liquid crystal molecules gathering together upon a phase separation between the liquid crystal molecules and the resin, and the liquid crystal molecules are randomly distributed in the liquid crystal capsules. Since the liquid crystal molecules are randomly distributed in the polymer dispersed liquid crystal display device, there is no specified viewing angle such as may appear when the liquid crystal molecules are aligned in the predetermined direction.

In a typical manufacturing process of a polymer dispersed liquid crystal display device, a pair of plates having transparent electrodes are bonded together by a peripheral seal; a mixture of light curable resin material and liquid crystal material is inserted in an interior space in the peripheral seal between these plates; and the resin material is cured by irradiating a light (for example, an ultraviolet light) onto a surface of one of the plates. As the resin cures, the liquid crystal molecules in small quantities are subjected to a phase separation from the resin and gather together in small grains to become liquid crystal capsules.

Recently, there is an increasing demand for a wide range of liquid crystal display devices, such as larged displays, high definition displays, and color displays. To this end, a color filter and a black matrix are provided in one of the plates, and an active matrix driver is provided in the other plate. The active matrix driver includes bus lines extending longitudinally and transversely in a matrix, and small picture electrodes are arranged in areas divided by the bus lines, the picture electrodes being connected to the bus lines via transistors (TFT; Thin Film Transistors).

In a conventional manufacturing process of a polymer dispersed liquid crystal display device, when an ultraviolet light is irradiated for curing the light curable resin material to form liquid crystal capsules, the ultraviolet light is irradiated perpendicularly to the surface of the plate. However, in the case of a polymer dispersed liquid crystal display device in which a black matrix is provided in one of the plates, and an active matrix driver is provided in the other plate, it has been found that the liquid crystal capsules are not uniformly distributed between the plates.

That is, the black matrix and bus lines are formed from metal and become a shading layer when a light is irradiated. Therefore, when an ultraviolet light is irradiated from either one of the plates, the ultraviolet light is not irradiated onto the light curable resin and the liquid crystal that are located under the shading layer. Thus the light curable resin located under the shading layer is not sufficiently hardened to fully advance a phase separation and accordingly to form the liquid crystal capsules. By observation, it has been found that the region in which the liquid crystal capsules are not formed is located not only under the shading layer, but extends into the area of the picture electrode. Accordingly, there is a portion in which the liquid crystal capsules do not exist, and a problem arises that contrast is reduced and brightness is also reduced.

SUMMARY OF THE INVENTION

The object of the present invention is to provide a polymer dispersed liquid crystal display device in which liquid crystal capsules are uniformly formed over the entire liquid crystal panel and thus a high efficiency is achieved.

According to the present invention, there is provided a liquid crystal display device comprising a first plate having transparent electrode means, a second plate arranged oppositely to the first plate with a small gap between the first and second plates and having transparent electrode means, a liquid crystal layer inserted between the first and second plates, a shading layer arranged in at least one of the first and second plates and having apertures, and the liquid crystal layer comprising a polymer dispersed liquid crystal including a layer of resin and liquid crystal capsules dispersed in the resin, the liquid crystal capsules being substantially uniformly distributed between the first and second plates all over the shading layer and the apertures therein.

With this arrangement, the liquid crystal capsules being substantially uniformly distributed between the first and second plates all over the shading layer and the apertures therein. That is, the liquid crystal capsules are substantially uniformly formed in the entire liquid crystal panel. Accordingly, it is possible to obtain a polymer dispersed liquid crystal display device in which contrast and brightness are high and high efficiency is achieved.

Preferably, the liquid crystal display device is manufactured in accordance with the manufacturing method comprising steps of bonding together the first and second plates by a peripheral seal extending along a periphery of the first and second plates, inserting a mixture of light curable resin material and a liquid crystal material in an interior space in the peripheral seal between the first and second plates, and irradiating a light obliquely onto a surface of the plate having the shading layer for curing the resin material in the mixture, the curing of the resin material accompanying a phase separation between the cured resin material and the liquid crystal material, whereby the liquid crystal capsules which are dispersed in the layer of the resin are formed.

By the oblique irradiation of an ultraviolet light onto the surface of one of the plates between which the liquid crystal layer is carried, the ultraviolet light can fully irradiate portions of the liquid crystal layer that are covered by the shading layer. Accordingly, the liquid crystal capsules are formed under the shading layer, and thus all over the shading layer and the apertures therein.

BRIEF DESCRIPTION OF THE DRAWINGS

The present invention will become more apparent from the following description of the preferred embodiments, with reference to the accompanying drawings, in which:

FIGS. 4A and 4B are cross-sectional views of a reflective type polymer dispersed liquid crystal display device according to the second embodiment of the present invention;

DESCRIPTION OF THE PREFERRED EMBODIMENTS

Figure 1:
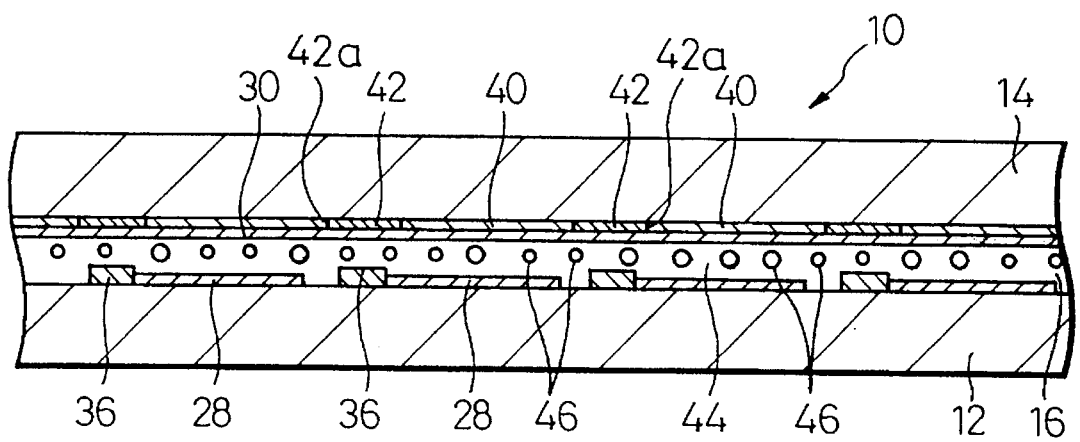
FIG. 1 is a cross-sectional view of a polymer dispersed liquid crystal display device according to the first embodiment of the present invention.

FIG. 1 shows the polymer dispersed liquid crystal display device 10 according to the first embodiment of the present invention. The liquid crystal display device 10 includes a liquid crystal panel comprising a first glass plate 12, a second glass plate 14 arranged oppositely to the first glass plate 12 with a small gap therebetween, and a liquid crystal layer 16 inserted between the first and second glass plates 12 and 14.

Figure 3A:
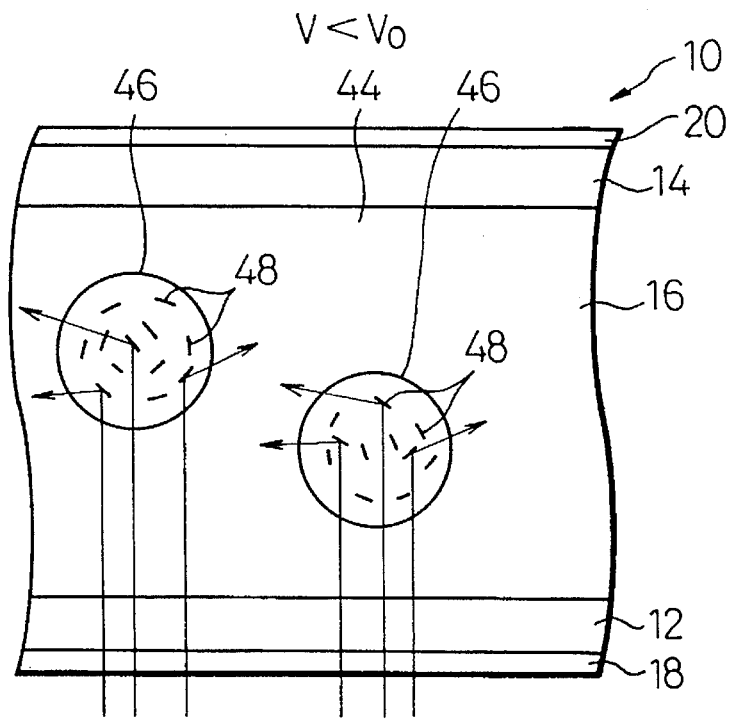
FIGS. 3A and 3B are views illustrating the operation of the polymer dispersed liquid crystal display device of FIG. 1.
Figure 3B:
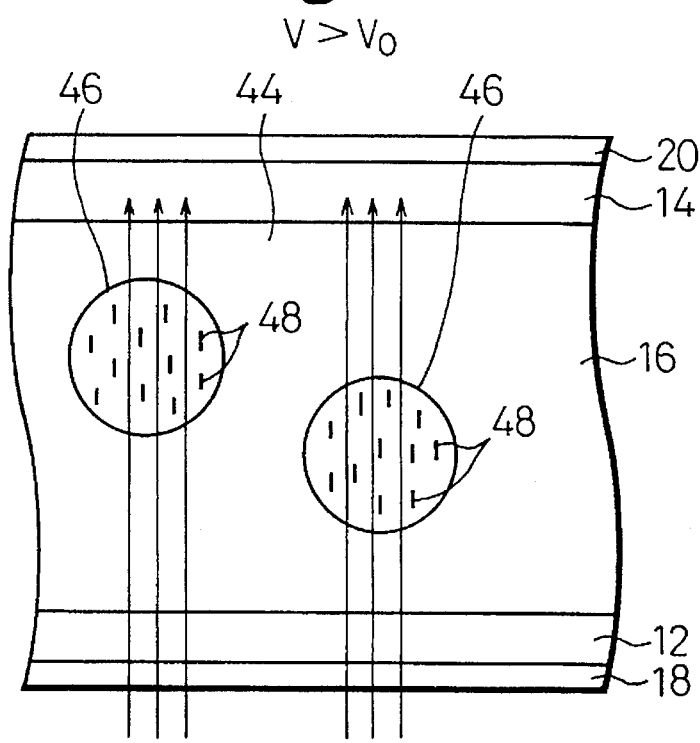

As shown in FIGS. 3A and 3B, a polarizer 18 and an analyzer 20 are arranged on the outsides of the liquid crystal panel. This embodiment shows a transmitting type liquid crystal display device, and thus the first and second glass plates 12 and 14 are transparent. The polarizer 18 and the analyzer 20 are arranged such that the respective axes of absorption of polarized light are perpendicular to each other.

Alternatively, as shown in FIGS. 4A and 4B, it is possible to arrange a color layer 22 and a reflective layer 24 in the first glass plate 12. This embodiment shows a reflective type liquid crystal display device, and the second glass plate 14 is transparent but the first glass plate 12 is opaque. In addition, a further transparent layer 26 is arranged between the liquid crystal layer 16 and the color layer 22 so that a certain distance is provided between the liquid crystal layer 16 and the color layer 22. Note that the transparent electrodes 28 and 30 are omitted in FIGS. 3A and 3B, and 4A and 4B for clarity. The polarizer 18 and the analyzer 20 are not provided in the device of FIGS. 4A and 4B.

In FIG. 1, a transparent electrode 28 is provided on the inner surface of the first glass plate 12 and also a transparent electrode 30 is provided on the inner surface of the second glass plate 14. In the preferred embodiment, the transparent electrode 28 comprises picture electrodes having small areas, and the transparent electrode 30 is a common electrode. The transparent electrodes 28 and 30 are formed from ITO ($In_2O_3$—$SnO_2$).

Figure 2:
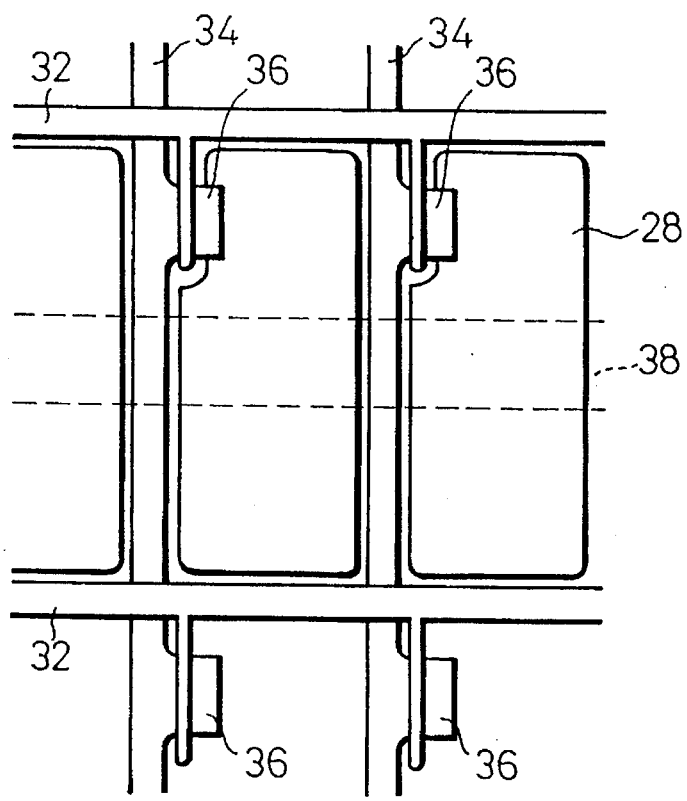
FIG. 2 is a partially enlarged plan view of the plate having the active matrix driver of FIG. 1.

As shown in FIG. 2, the picture electrodes 28 are connected to an active matrix driver which comprises gate bus lines 32 and drain bus lines 34 extending transversely and longitudinally in a matrix, and transistors (TFT) 36, the picture electrodes 28 being connected to the gate bus lines 32 and the drain bus lines 34 via the transistors 36, respectively. There are storage capacitors 38 under the picture electrodes 28 (under an insulating layer, not shown).

As shown in FIG. 1, a color filter 40 and a black matrix 42 are arranged under the transparent electrode 30 of the second glass plate 14. The black matrix 42 has apertures 42a allowing the color portions of the color filter 40 to be revealed. The black matrix 42, the gate bus lines 32 and the drain bus lines 34 are made from metal, and shade incoming light.

The liquid crystal layer 16 comprises liquid crystal capsules 46 dispersed in a layer of a resin 44. For example, the liquid crystal capsules 46 comprise a p-type nematic liquid crystal, and the resin comprises a light curable resin such as polymethyl methacrylate (PMMA). As shown in FIG. 1, the liquid crystal capsules 46 are substantially uniformly distributed between the first and second glass plates 12 and 14 all over the shading layer (such as the black matrix 42) and the apertures 42a therein.

The operation of the polymer dispersed liquid display device 10 is as follows.

As shown in FIG. 3A, when the voltage is not applied (the applied voltage V is lower than the threshold voltage $V_0$), the liquid crystal molecules 48 in the liquid crystal capsules 46 are randomly distributed. Accordingly, the light passing through the polarizer 18 impinges on the liquid crystal molecules 48 in the liquid crystal capsules 46 and is scattered in all the directions. Thus, a portion of the scattering light can pass through the analyzer 20, and this produces a white spot on the display.

As shown in FIG. 3B, when the voltage is applied (the applied voltage V is higher than the threshold voltage $V_0$), the liquid crystal molecules 48 in the liquid crystal capsules 46 become perpendicular to the surface of the first and the second glass plates 12 and 14. Accordingly, the light passing through the polarizer 18 and the liquid crystal molecules 48 in the liquid crystal capsules 46 reaches the analyzer 20 with the plane of vibration of the polarized light maintained. The polarized light cannot pass through the analyzer 20 since the axis of absorption of the analyzer 20 is perpendicular to that of the polarizer 18. Accordingly, this produces a black spot on the display.

In the reflective type liquid display device of FIGS. 4A and 4B, when the voltage is not applied (the applied voltage V is lower than the threshold voltage $V_0$), the liquid crystal molecules 48 in the liquid crystal capsules 46 are randomly distributed, as shown in FIG. 4A. Accordingly, the incident light impinges on the liquid crystal molecules 48 in the liquid crystal capsules 46 and is scattered in all the directions. Thus, this produces a white spot at the display. In this instance, the appearance of color layer 22 is diffused and cannot be seen if the thick transparent layer 26 exists.

As shown in FIG. 4B, when the voltage is applied (the applied voltage V is higher than the threshold voltage $V_0$), the liquid crystal molecules 48 in the liquid crystal capsules 46 become perpendicular to the surface of the first and the second glass plates 12 and 14. Accordingly, the liquid crystal layer 16 becomes transparent, and the color layer 22 can be seen. If the color layer 22 is black, the display is black but it is possible that the color layer can be any color.

As described above, in a manufacturing process of a polymer dispersed liquid crystal display device 10 comprising a liquid crystal layer 16 containing liquid crystal capsules 46, a mixture of light curable resin 44 material and liquid crystal material is prepared, and then the resin 44 is cured by irradiating ultraviolet light onto one of the glass plates after the mixture is inserted between the first and second glass plates 12 and 14, whereby the liquid crystal molecules 48 are subjected to a phase separation from the resin 44 to become liquid crystal capsules 46 dispersed in the resin 44.

Figure 5:
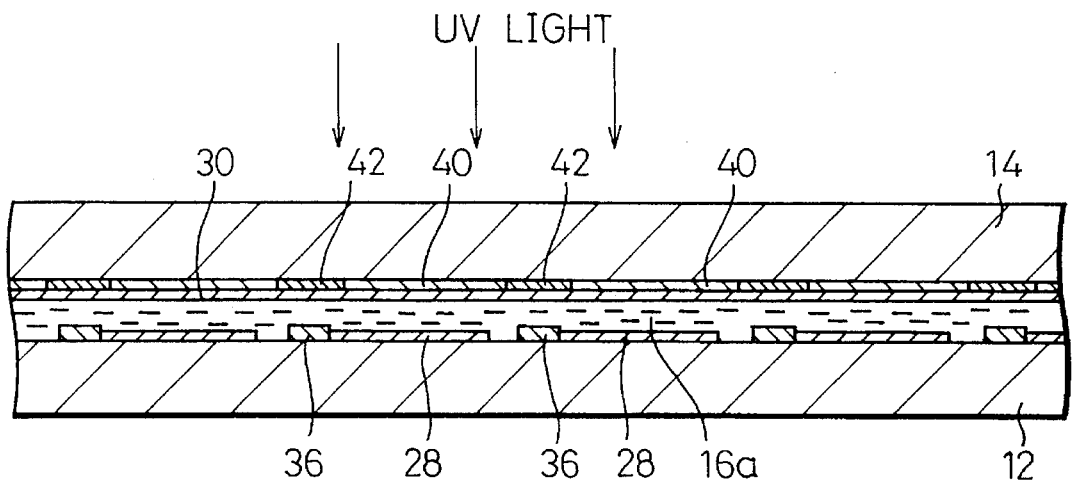
FIG. 5 is a view illustrating an irradiation of an ultraviolet light of a prior art.

In the prior art, as shown in FIG. 5, upon the irradiation of the ultraviolet light through one of the glass plates (14, for example), the ultraviolet light is irradiated perpendicular to the surface of the glass plate 14. Therefore, the black matrix 42 becomes a shading layer and the ultraviolet light does not reach a portion of the mixture 16a of the light curable resin material and liquid crystal material under the black matrix 42. Thus the light curable resin 44 located under the black matrix 42 is not sufficiently hardened to fully complete phase separation and to form the liquid crystal capsules 46.

Figure 6:
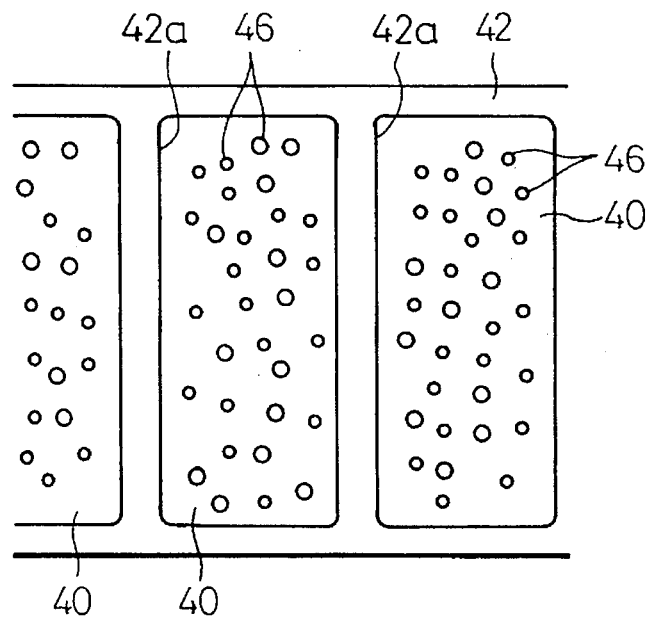
FIG. 6 is a view illustrating a distribution of the liquid crystal capsules of a prior art.

FIG. 6 shows a distribution of the liquid crystal capsules 46 in this case. The liquid crystal capsules 46 do not exist in the region covered by the black matrix 42 but exist in the regions corresponding to the apertures 42a from which the color portions of the color filter 40 are revealed. In addition, the liquid crystal capsules 46 do not exist in the peripheral portions in the regions corresponding to the apertures 42a. Thus a problem arises that contrast and brightness are reduced. When the ultraviolet light is irradiated from the second glass plate 12, a similar problem arises since the gate bus lines 32 and the drain bus lines 34 become a shading layer.

Figure 7:
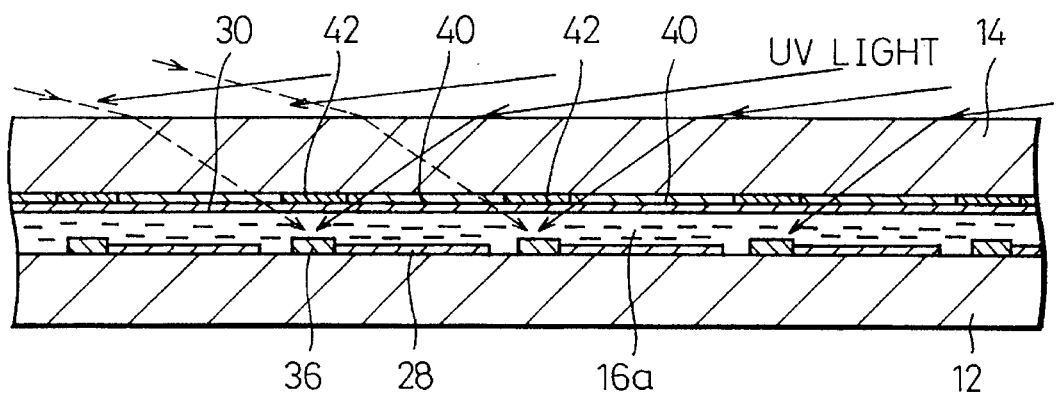
FIG. 7 is a view illustrating an example of an oblique irradiation of an ultraviolet light according to the present invention.

In the preferred embodiment, as shown in FIG. 7, the ultraviolet light, from the side of one of the glass plates (14, for example), is irradiated obliquely to the surface of the glass plate 14.

As is well known, at the initial stage of the manufacturing process of the polymer dispersed liquid crystal display device 10, the first and second glass plates 12 and 14 are bonded together by a peripheral seal 50 (see FIG. 9) located at a peripheral region of the first and second plates 12 and 14 for enclosing the liquid crystal therein, and the mixture 16a of light curable resin 44 material and liquid crystal material is inserted in an interior space in the peripheral seal 50 between the first and second plates 12 and 14.

Then, as shown in FIG. 7, the ultraviolet light is irradiated obliquely to the surface of the second glass plate 14 having the shading layer in the form of the black matrix 42 (or to the first glass plate 12 having the shading layer in the form of the gate bus lines 32 and the drain bus lines 34) for curing the resin 44 material in the mixture 16a. The resin 44 is hardened by the irradiation of the ultraviolet light, accompanying a phase separation between the cured resin 44 material and the liquid crystal material, whereby the liquid crystal capsules 46 which are dispersed in the layer of the resin 44 are formed.

In this way, by irradiating the ultraviolet light obliquely to the surface of the second glass plate 14, the ultraviolet light obliquely transmits the second glass plate 14 and can reach regions under the shading layer in the form of the black matrix 42 (or the bus lines). In this case, if the ultraviolet light is irradiated from only one direction, as shown by the solid arrows in FIG. 7, there may be shadow portions under the shading layer. Accordingly, it is preferable to irradiate the ultraviolet light from one direction, as shown by the solid arrows in FIG. 7, as well as from the other direction, as shown by the broken arrows in FIG. 7, so that there are no shadow portions under the shading layer, whereby the ultraviolet light reaches all the mixture 16a of light curable resin 44 material and liquid crystal material and the light curable resin 44 is sufficiently cured to advance the phase separation to create the liquid crystal capsules 46 all over the shading layer and the apertures 42a therein.

Figure 8:
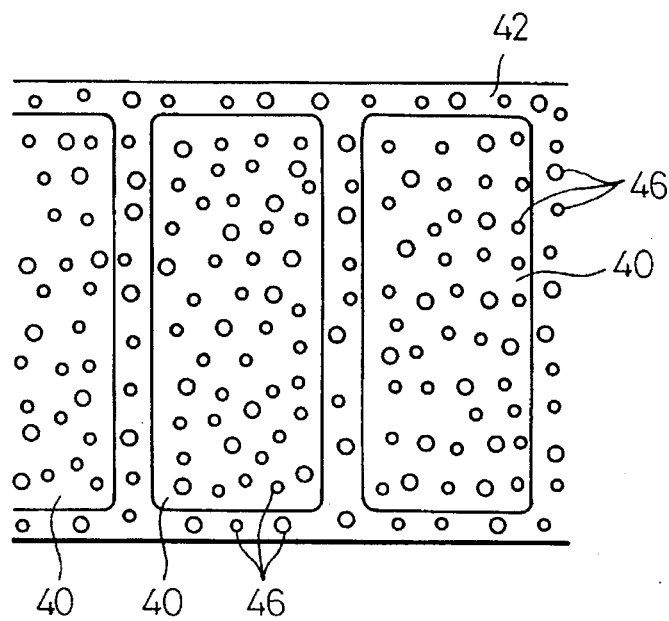
FIG. 8 is a view illustrating an example of a distribution of the liquid crystal capsules according to the present invention.

FIG. 8 shows a distribution of the liquid crystal capsules 46 formed in this manner. The liquid crystal capsules 46 are distributed substantially uniformly in the region covered by the black matrix 42 and in the regions corresponding to the apertures 42a, and thus all over the entire liquid crystal panel. If the ultraviolet light is irradiated from the other, first glass plate 12, the gate bus lines 32 and the drain bus lines 34 become a shading layer, but the ultraviolet light can reach regions under the shading layer by the oblique irradiation.

As shown in FIG. 7, in the case where the ultraviolet light is irradiated to the surface of the second glass plate 14, there is a refraction at the surface of the second glass plate 14. According to the present invention, it is necessary that the angle of refraction is oblique to the surface of the second glass plate 14. According to the Snell's law of refraction, the angle of refraction is smaller than the angle of incidence, and the angle of incidence must be such that the angle of refraction is not 90 degrees for causing the light to be incident obliquely to the liquid crystal layer 16. To this end, it is necessary that the angle of incidence to the surface of the second glass plate 14 is greater than 45 degrees, and in particular, the ultraviolet light should be incident to the surface of the second glass plate 14 at an angle whereby the incident light is as close as possible to the surface of the second glass plate 14. It is also preferable that the ultraviolet light should comprise parallel beams for uniformly impinging the second glass plate 14.

Figure 9:
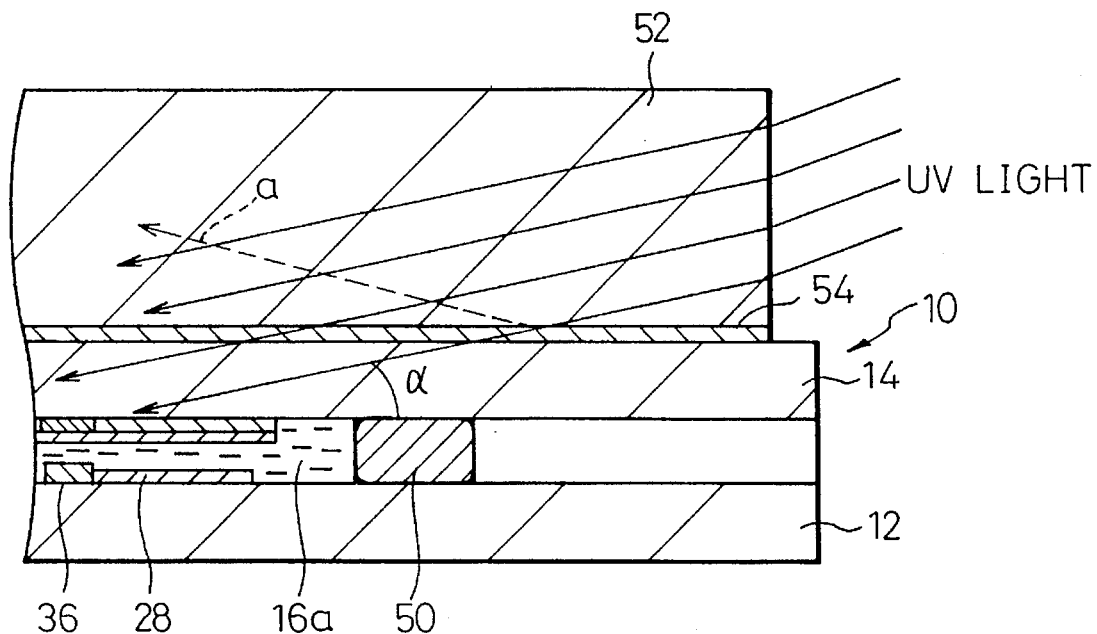
FIG. 9 is a view illustrating another example of an oblique irradiation of an ultraviolet light, using a supplemental transparent plate.

FIG. 9 shows another example of the oblique irradiation of the ultraviolet light to the second glass plate 14, using a supplemental transparent plate 52 superposed on the second glass plate 14. The supplemental transparent plate 52 is made from a silica glass which is transparent to the ultraviolet light and has a thickness of approximately 50 millimeters (mm), for example. The thickness of the liquid crystal layer 16 is approximately 5 to 20 microns (μm), and the thickness of the glass plates 12 and 14 is approximately 1.1 millimeters (mm). FIG. 9 shows a portion of a peripheral edge of the glass plates 12 and 14, and the glass plates 12 and 14 are bonded together by a peripheral seal 50 extending along a periphery of the glass plates 12 and 14. The mixture 16a for the liquid crystal layer 16 is inserted in an interior space in the peripheral seal 50.

As described above, the ultraviolet light should be incident to the surface of the second glass plate 14 at an angle whereby the incident light is as close as possible to the surface of the second glass plate 14. However, when the ultraviolet light is incident obliquely to the surface of the second glass plate 14, a large proportion of the incident ultraviolet light reflects at the surface of the second glass plate 14.

In FIG. 9, the ultraviolet light is caused to be incident obliquely to the end surface of the supplemental transparent plate 52. The angle of incidence of the ultraviolet light at the end surface of the supplemental transparent plate 52 is small, that is, the ultraviolet light is caused to be incident obliquely to the end surface of the supplemental transparent plate 52 at an angle whereby the incident light is as perpendicular as possible to the surface of the second glass plate 14. Accordingly, it is possible to minimize the reflection of the ultraviolet light at the end surface of the supplemental transparent plate 52. Also, the angle of refraction of the ultraviolet light at the end surface of the supplemental transparent plate 52 is small because the angle of incidence is small. Accordingly, the ultraviolet light is incident to the surface of the second glass plate 14 at an angle whereby the incident light is as close as possible to the surface of the second glass plate 14. The angle of the ultraviolet light forming with the surface of the second glass plate 14 when the ultraviolet light propagates in the second glass plate 14 is shown by the angle $\alpha$. The angle $\alpha$ should be smaller than 45 degrees, and preferably 10 degrees.

In FIG. 9, a layer of coupling oil 54 is inserted between the supplemental transparent plate 52 and the second glass plate 14. The layer of coupling oil 54 has an index of refraction greater than that of air, and preferably close to the indexes of refraction of the supplemental transparent plate 52 and the second glass plate 14, so that the index of refraction of the layer between the supplemental transparent plate 52 and the second glass plate 14 approaches the indexes of refraction of the supplemental transparent plate 52 and the second glass plate 14. It is possible, for example, to use the "immersion oil" distributed by Olympus Optical Co. Ltd. in Japan for the coupling oil 54.

If the layer of coupling oil 54 is not inserted, a thin layer of air may sometimes exist between the supplemental transparent plate 52 and the second glass plate 14. When the layer of coupling oil 54 is not inserted under the supplemental transparent plate 52, the light which reaches the bottom surface of the supplemental transparent plate 52 is reflected as a total internal reflection, as shown by the broken arrow in FIG. 9. To prevent this total internal reflection, the layer of coupling oil 54 is preferably inserted between the supplemental transparent plate 52 and the second glass plate 14. The insertion for this purpose is not limited to the above described oil, but it is possible to use a liquid or paste material which can fill the gap between the supplemental transparent plate 52 and the second glass plate 14, is transparent, and has a desired index of refraction greater than that of air. One of the preferable materials other than the oil is, for example, a silicon rubber.

Figure 10:
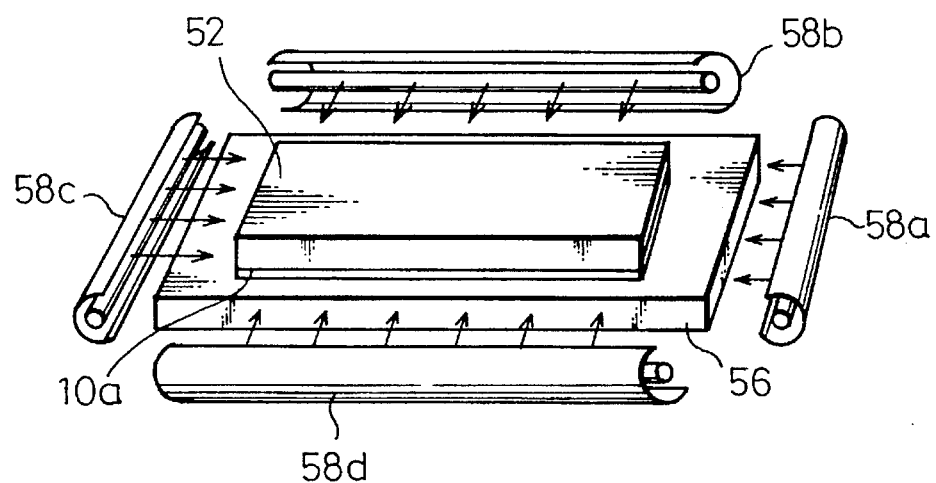
FIG. 10 is a perspective view of the device of FIG. 9, illustrating an arrangement of the source of light in FIG. 9.

FIG. 10 shows the arrangement of the source of light in FIG. 9, in which the liquid crystal panel 10a is placed on a table 56 with the panel 10a having the mixture 16a of the uncured resin material 44 and the liquid crystal material inserted between the first and second glass plates 12 and 14, and in which the supplemental transparent plate 52 is placed on the panel 10a. Four sources of light 58a to 58d comprising an elongated lamp and a concave mirror, respectively, are located parallel to the respective side of the panel 10a. Each of sources of light 58a to 58d is arranged toward each side of the panel 10a, so that the ultraviolet light is incident to the respective end surface of the supplemental transparent plate 52, passes through the supplemental transparent plate 52, and is incident obliquely to the surface of the second glass plate 14 to cure the resin 44. In this case, the ultraviolet light is incident from the four sides, and there is no shadow portions under the black matrix 42 or the bus lines 32 and 34.

Figure 11:
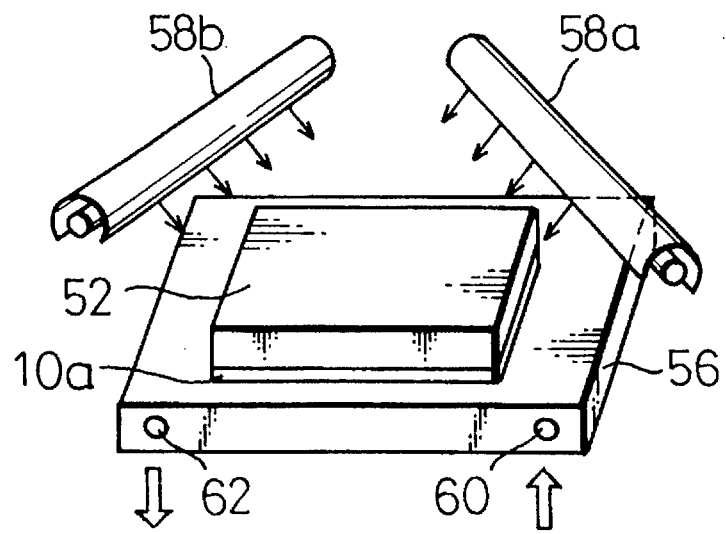
FIG. 11 is a perspective view illustrating another example of the arrangement of the source of light.

FIG. 11 shows another example of the arrangement of the source of light. In this example, the liquid crystal panel 10a is placed on a table 56 and the supplemental transparent plate 52 is placed on the panel 10a. Two sources of light 58a and 58b comprising an elongated lamp and a concave mirror, respectively, are located at the adjacent corners of the panel 10a at the angle of 45 degrees to the side thereof. Each of sources of light 58a and 58b is arranged toward each corner of the panel 10a, so that the ultraviolet light is incident to the respective end surface of the supplemental transparent plate 52, passes through the supplemental transparent plate 52, and is incident obliquely to the surface of the second glass plate 14 to cure the resin 44. In this case too, the ultraviolet light is incident from the two sides, and there are no shadow portions under the black matrix 42 or the bus lines 32 and 34. Alternatively, it is possible to arrange two sources of light 58a and 58b at diagonally opposite positions.

In FIG. 11, a cooling circulating circuit having an inlet 60 and an outlet 62 is provided in the table 56. By cooling the table 56 in this way, it is possible to prevent from the first and second glass plates 12 and 14 from being overheated due to the irradiation of the ultraviolet light. The cooling circulating circuit can also be provided in the example of FIG. 9.

Figure 12:
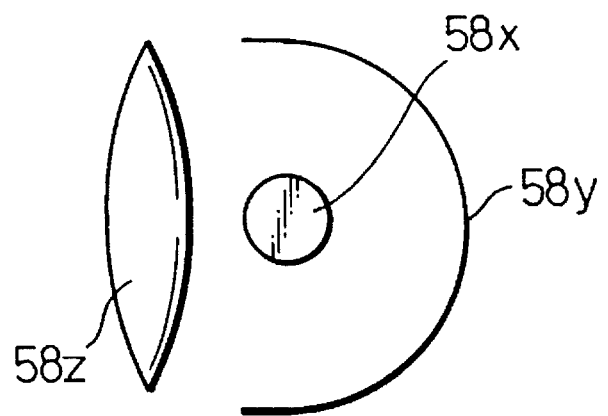
FIG. 12 is a side view of an example of the source of light to obtain parallel light beams.

FIG. 12 shows an example of the source of light. This source of light comprises an elongated lamp 58x, a concave mirror 58y partially covering the lamp 58x, and a convex lens 58z. This is simply one of the examples to obtain beams of the light as parallel as possible, as it is preferable to irradiate the material of the resin 44 by beams of light as parallel as possible.

Figure 13A:
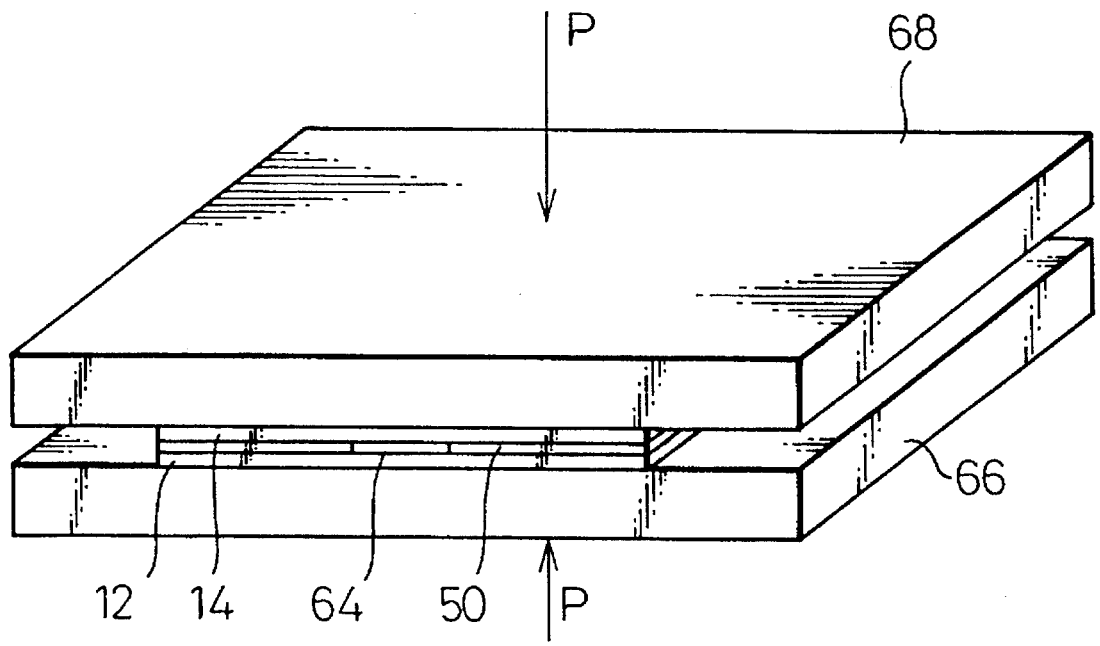
FIGS. 13A and 13B are views illustrating a manufacturing steps after the plates are bonded together and the liquid crystal is inserted between the plates.
Figure 13B:
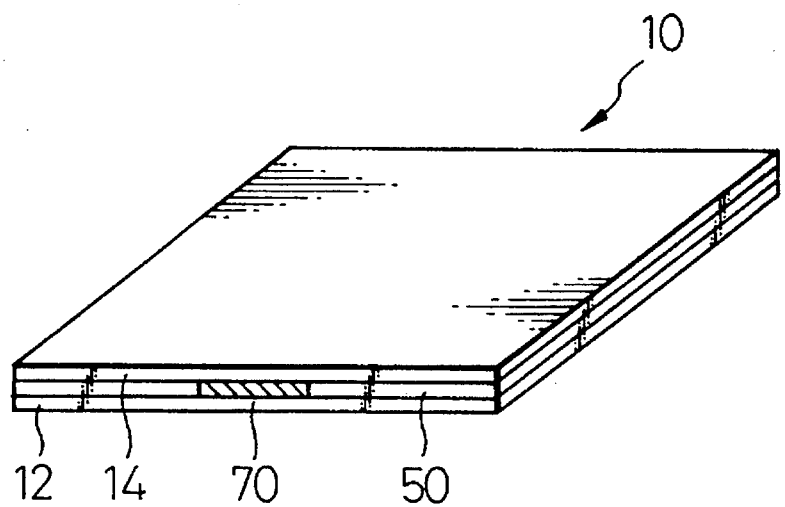

FIGS. 13A and 13B are views illustrating the manufacturing steps after the first and second glass plates 12 and 14 are bonded together by the peripheral seal 50 and the liquid crystal is inserted between the plates 12 and 14. The first and second glass plates 12 and 14 have electrodes 28 and 30 or the like, respectively, and the peripheral seal 50 has a liquid crystal inlet 64.

The liquid crystal is inserted from this liquid crystal inlet 64 into the interior space in the peripheral seal 50 between the first and second glass plates 12 and 14. Usually, the insertion of the liquid crystal is carried out in a vacuum insertion apparatus. The liquid crystal is contained in a vessel in the vacuum insertion apparatus. At the beginning of the insertion, the bonded first and second glass plates 12 and 14 are placed in the vacuum insertion apparatus, and a vacuum is introduced in the vacuum insertion apparatus to make the interior space in the peripheral seal 50 into a vacuum. Then the liquid crystal inlet 64 is dipped in the liquid crystal in the vessel and then the vacuum in the insertion apparatus is destroyed. Accordingly, the liquid crystal is introduced into the interior space in the peripheral seal 50, between the first and second glass plates 12 and 14, by capillary action and the difference in the interior and exterior pressures. When the liquid crystal is introduced into the interior space in the peripheral seal 50 between the first and second glass plates 12 and 14, it is observed that the first and second glass plates 12 and 14 bulge outwardly beyond the predetermined distance between the first and second glass plates 12 and 14.

Whereupon, the manufacturing method according to the present invention includes the step of pressing together the first and second glass plates 12 and 14, to a predetermined distance therebetween, by a pressure P applied by a pair of pinching plates 66 and 68 arranged on either side of the first and second glass plates 12 and 14, as shown in FIG. 13A. As an example, if the arrangement is such that one of the pinching plates 66 is the table 56 of FIGS. 10 and 11, and the other pinching plate 68 is the supplemental transparent plate 52 of FIGS. 10 and 11, it is possible to carry out the subsequent ultraviolet irradiation step without changing the arrangement of the plate and the table. In this case, the supplemental transparent plate 52 is considerably thick and thus heavy, and it is possible to apply the pressure P by the weight of the supplemental transparent plate 52. Then, the liquid crystal inlet 64 is closed by a plug 70 after the distance between the first and second glass plates 12 and 14 is set to a predetermined value, as shown in FIG. 13B.

Figure 14A:
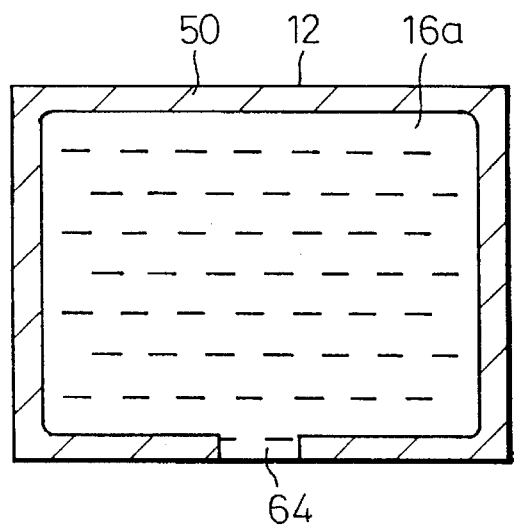
FIGS. 14A to 14D are cross-sectional views taken along the horizontal intermediate plane of the peripheral seal for illustrating the steps of forming the plug of FIGS. 13A and 13B and irradiating the resin to form the liquid crystal capsules.

FIGS. 14A to 14D are cross-sectional views taken along the horizontal intermediate plane of the peripheral seal 50 for illustrating the steps of forming the plug 70 of FIGS. 13A and 13B and irradiating the resin 44 to form the liquid crystal capsules 46. FIG. 14A shows that the mixture 16a of the light curable resin material 44 curable by the ultraviolet light and the liquid crystal material is inserted in the interior space between the first and second glass plates 12 and 14. The distance between the first and second glass plates 12 and 14 is set to a predetermined value, as described with reference to FIG. 13B.

Figure 14C:
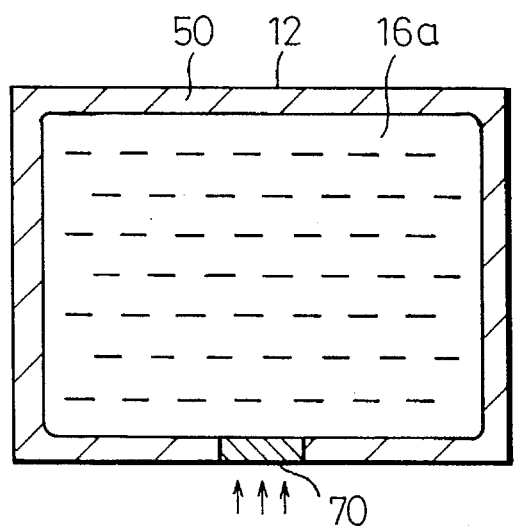
Figure 14B:
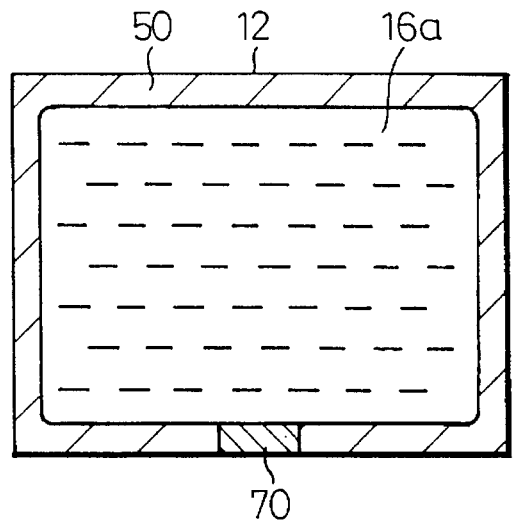

FIG. 14B shows that the liquid crystal inlet 64 is closed by the plug 70. In the preferred embodiment, the plug 70 comprises a light curable material which is curable by a light having wavelength by which the resin 44 in the mixture 16a is not cured. For example, the material of the resin 44 in the mixture 16a is curable by the ultraviolet light, and the material of the plug 70 is curable by the visible light. The material of the resin 44 in the mixture 16a is not curable by the visible light. For example, it is possible to use "LCR0242D" distributed by ICI Ltd. in the United Kingdom for the material of the plug 70. This is curable by the visible light having wavelength greater than 440 nm.

Figure 14D:
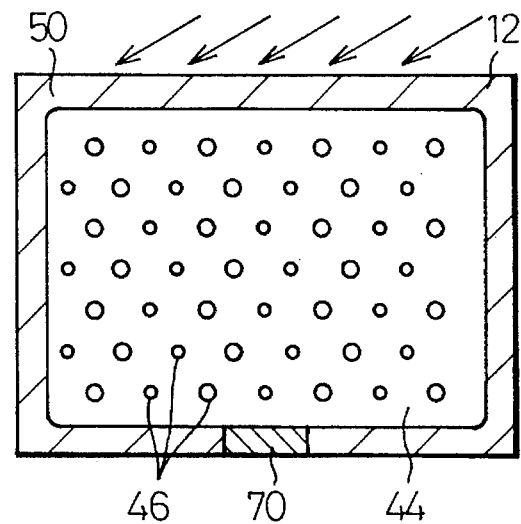

FIG. 14C shows that the visible light is irradiated to the plug 70. The plug 70 is thus completely cured and the interior space in the peripheral seal 50 is completely sealed. However, the material of the resin 44 in the mixture 16a is not cured at all, when the visible light is applied. In this way, the material of the resin 44 in the mixture 16a is not affected by the irradiation for the hardening of the plug 70. If the material of the resin 44 in the mixture 16a is affected by the irradiation for the hardening of the plug 70 and the resin 44 is partially hardened at this step, there is a possibility that the liquid crystal capsules 46 is not uniformly formed at the subsequent step. Then as shown in FIG. 14D, the ultraviolet light is obliquely irradiated to cure the resin 44 and to uniformly form the liquid crystal capsules 46 due to the phase separation.

Figure 15:
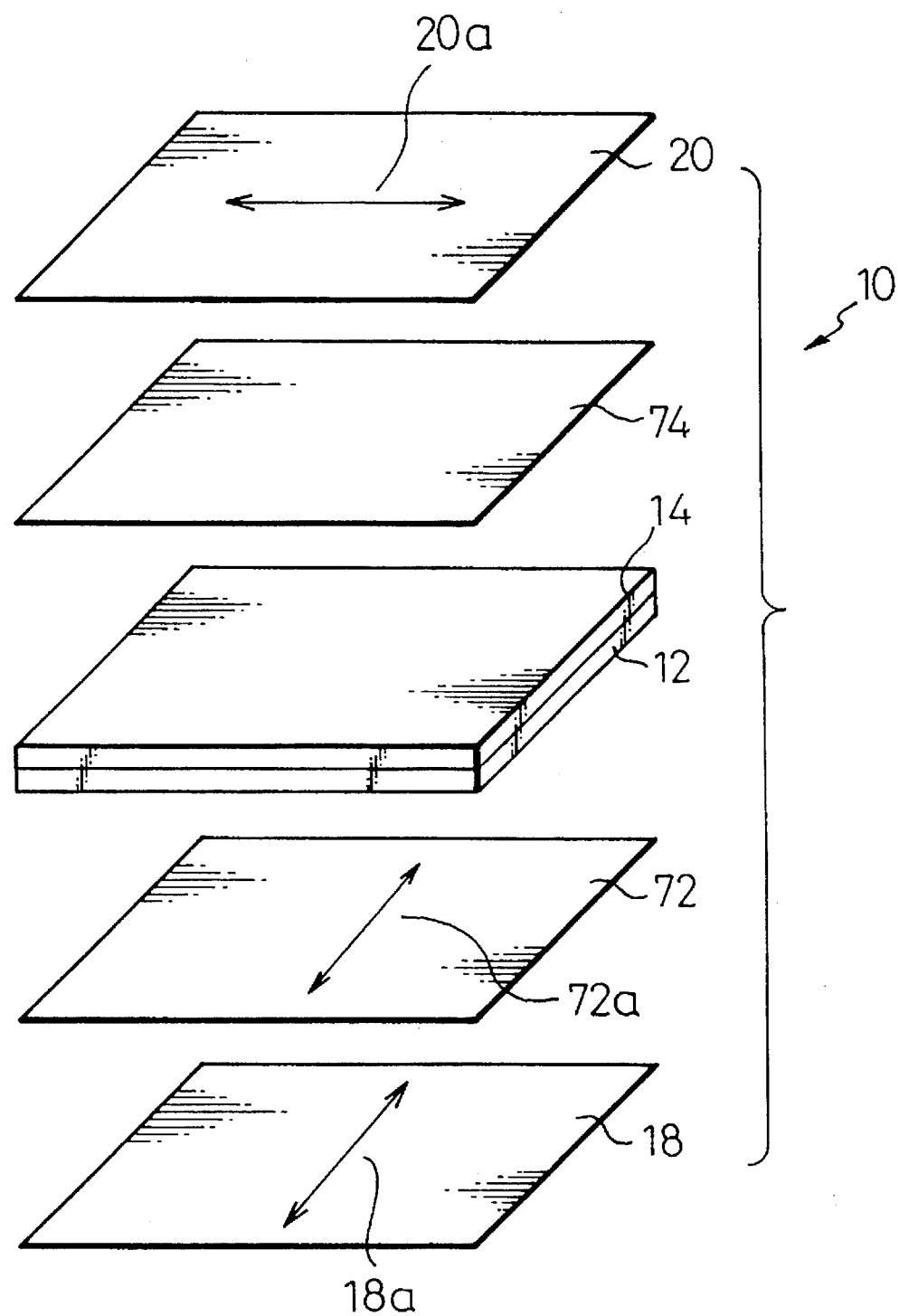
FIG. 15 is a diagrammatic view of a polymer dispersed liquid crystal display device according to a further embodiment of the present invention.

FIG. 15 shows a polymer dispersed liquid crystal display device 10 according to a further embodiment of the present invention, somewhat modified from the embodiment of FIGS. 3A and 3B. In the embodiments of FIGS. 3A and 3B, and 15, the polarizer 18 and the analyzer 20 are arranged on the outsides of the first and second glass plates 12 and 14 so that the respective axes of absorption 18a and 20a of polarized light are perpendicular to each other. In this arrangement, as shown in FIG. 3B, when the voltage is applied, the liquid crystal molecules 48 in the liquid crystal capsules 46 become perpendicular to the surface of the first and the second glass plates 12 and 14, and the light passing through the polarizer 18 is blocked by the analyzer 20 to produce a black spot at the display. However, a portion of the light obliquely incident to the polarizer 18 obliquely passes through the liquid crystal molecules 48 in the liquid crystal capsules 46, and thus is affected, by birefringence, by the liquid crystal molecules 48 whereby the plane of polarization is changed. Therefore, a portion of the light will be able to pass through the analyzer 20 and a problem arises that a light appears when a black spot must be produced.

To solve this problem, a first film 72 having anisotropic indices of refraction in the plane of the film 72 and a second film 74 having isotropic indices of refraction in the plane of the film 74 and anisotropic indices of refraction in the perpendicular direction to the plane of the film 74 are arranged between the polarizer 18 and the analyzer 20. In the embodiment, the first film 72 is arranged between the first glass plate 12 and the polarizer 18, and the second film 74 is arranged between the second glass plate 14 and the analyzer 20. It is possible to arrange the first and second films 72 and 74 reversely or at the same side.

The first film 72 is a uniaxially oriented phase film, which is obtained by stretching a film of, for example, polyvinyl alcohol (PVA) or polyethylene terephthalate (PET) in one direction. The first film 72 is arranged so that an axis of orientation 72a coincides with the optical axis (axis of absorption) of one of the polarizer 18 and the analyzer 20. The second film 74 has a negative uniaxial anisotropic indices of refraction and is obtained by stretching a film of, for example, polyvinyl alcohol (PVA) in two directions.

Figure 16A:
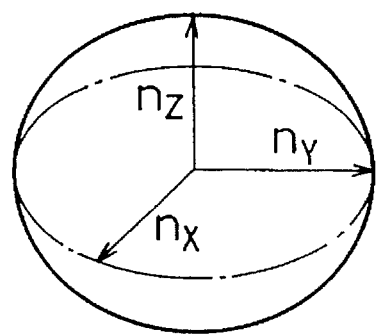
FIGS. 16A and 16B are views illustrating ellipsoids of anisotropic indices of refraction of the second film of FIG. 15 and the liquid crystal, respectively.
Figure 16B:
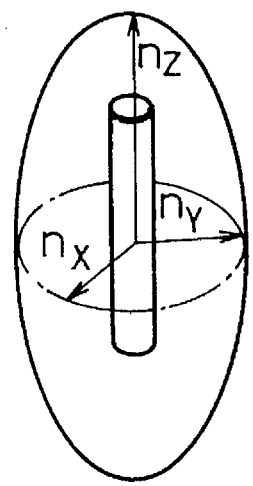

FIGS. 16A and 16B are views illustrating ellipsoids of anisotropic indices of refraction of the second film 74 of FIG. 15 and the p-type nematic liquid crystal, respectively, in which three axial indices of refraction $n_x$, $n_y$, and $n_z$ are shown. FIG. 16A shows the ellipsoid of anisotropic indices of refraction of the second film 74, and in this case, there is a relationship, $n_x=n_y>n_z$. FIG. 16B shows the ellipsoid of anisotropic indices of refraction of the p-type nematic liquid crystal, and this corresponds to the condition in which the liquid crystal molecules 48 are oriented as shown in FIG. 3B. In the condition in which the p-type liquid crystal molecules 48 are oriented perpendicular to the plane of the display, there is a relationship, $n_x=n_y<n_z$. In this way, if the second film 74 and the liquid crystal layer 16 are superposed, the optical effects of birefringence of these layers are canceled by one another and it is possible to prevent the above described leaked light when the light propagates obliquely.

However, the effect of the above method of preventing leaked light varies from one condition when the display is viewed from the direction along the axis of absorption 18a of the polarizer 18 and the axis of absorption 20a of the analyzer 20 to another condition when the display is viewed from the direction rotated by 45 degrees from the axis of absorption 18a of the polarizer 18 and the axis of absorption 20a of the analyzer 20. The first film 72 minimizes the variation of the effect of preventing the leaked light due to the rotated viewing angle, as described below.

Figure 17:
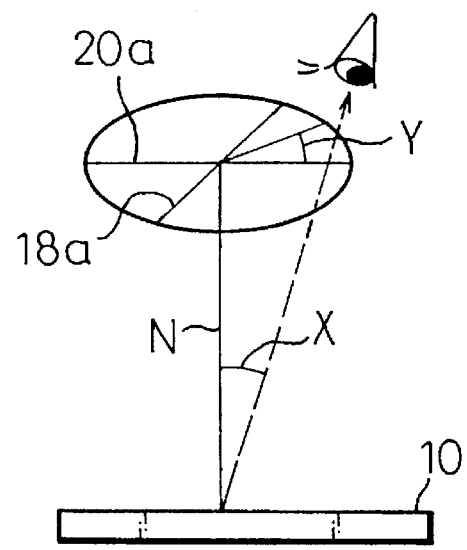
FIG. 17 is a view illustrating when the display is viewed obliquely at a viewing angle.

FIG. 17 shows that the display is viewed obliquely at a visual angle of depression X relative to the normal line N and a visual rotating angle Y. In FIG. 17, the lines 18a and 20a are projections of the axes of absorption of the polarizer 18 and the analyzer 20, respectively.

Figure 18:
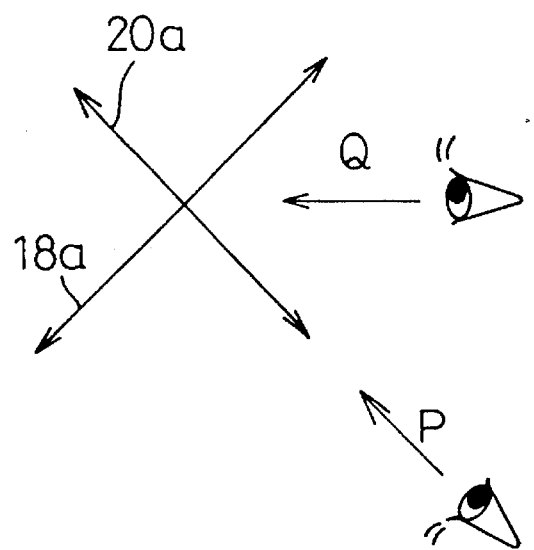
FIG. 18 is a view illustrating the display device of FIG. 17 from above.

FIG. 18 shows the display device of FIG. 17 from above, in which the viewing direction is indicated by the arrow P when the visual angle of depression X of FIG. 17 is a positive value and the visual rotating angle Y from the axis of absorption of the polarizer 18 (or the axis of absorption of the analyzer 20) is 0 degree, and the viewing direction is indicated by the arrow Q when the visual angle of depression X of FIG. 17 is a positive value and the visual rotating angle Y is 45 degrees.

Figure 19A:
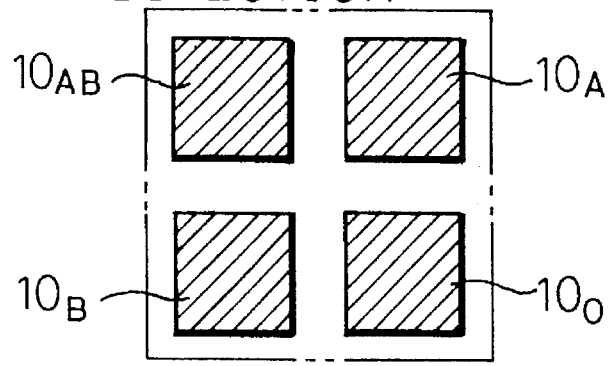
FIGS. 19A to 19C are views illustrating the effect of preventing a leaked light of the display device of FIG. 15.
Figure 19B:
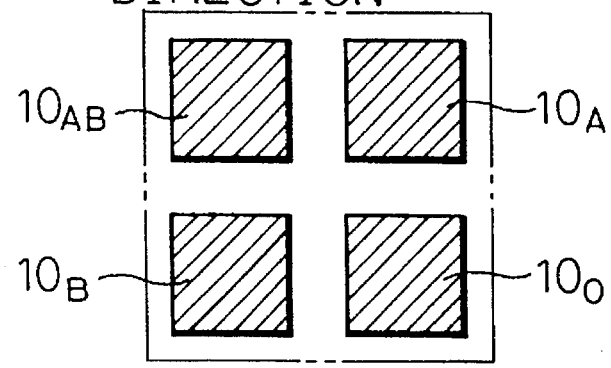
Figure 19C:
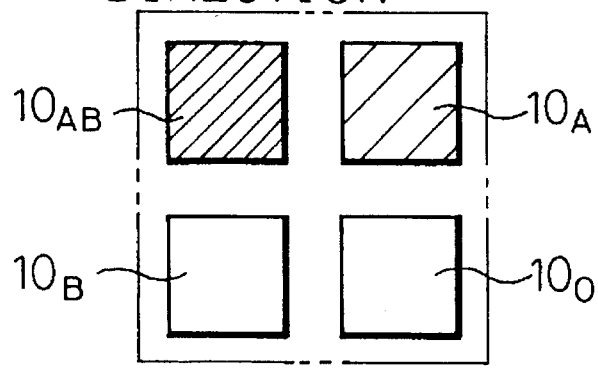

FIGS. 19A to 19C show the experimental results of the effect of preventing the leaked light of the display device of FIG. 15, viewed from different directions. Four samples $10_0$, $10_A$, $10_B$, and $10_{AB}$ of the polymer dispersed liquid display device are prepared. The sample $10_0$ corresponds to the device of FIGS. 3A and 3B, in which the first and second films 72 and 74 are not provided. The sample $10_A$ includes only the second film 74 and the sample $10_B$ includes only the first film 72. The sample $10_{AB}$ corresponds to the device of FIG. 15, in which the first and second films 72 and 74 are provided.

FIGS. 19A shows that the four samples are viewed from the direction N of FIG. 17. In this case, it is possible to obtain a good black display regarding each of four samples. FIG. 19B shows that the four samples are viewed from the direction P of FIG. 18. In this case too, it is possible to obtain a good black display regarding each of four samples. FIG. 19C shows that the four samples are viewed from the direction Q of FIG. 18. In this case, it is possible to obtain a good black display regarding the sample $10_{AB}$ but the other samples seems gray. It has been found that the leaked light is somewhat prevented regarding the sample $10_A$, but a considerable leaked light appears regarding the samples $10_0$ and $10_B$. Accordingly, the sample $10_{AB}$ has a good effect of preventing the leaked light.

As explained in detail, it is possible, according to the present invention, to provide a polymer dispersed liquid crystal display device in which the liquid crystal capsules are uniformly formed in the entire liquid crystal panel and thus a good efficiency of display is achieved with a high contrast and a high brightness.

We claim:

1. A liquid crystal display device comprising:
   a first plate having transparent electrode means;
   a second plate arranged oppositely to the first plate with a small gap between the first and second plates and having transparent electrode means;
   a liquid crystal layer inserted between the first and second plates;
   a shading layer arranged in at least one of the first and second plates and having apertures; and
   the liquid crystal layer comprising a polymer dispersed liquid crystal including a layer of light curable resin and liquid crystal capsules dispersed in the resin, the liquid crystal capsules being substantially uniformly distributed between the first and second plates throughout the gap between the first and second plates, the liquid crystal material of the liquid crystal capsules being in direct contact with the resin, the liquid crystal capsules in the vicinity of the shading layer being larger than the liquid crystal capsules in a remainder portion of the liquid crystal layer.

2. A liquid crystal display device according to claim 1, wherein the plate having the shading layer comprises a color filter having color portions and a black matrix having apertures revealing the color portions of the color filter, and the shading layer comprises the black matrix.

3. A liquid crystal display device according to claim 1, wherein the transparent electrode means of the plate having the shading layer comprises a plurality of minute picture electrodes which are connected via transistors to bus lines extending in a matrix, and the shading layer comprises the bus lines connected to the transparent electrode means.

4. A liquid crystal display device according to claim 1, wherein the plate other than that having the shading layer has a color layer and a reflecting layer.

5. A liquid crystal display device according to claim 1, wherein a polarizer and an analyzer are arranged on the outside of the first and second plates.

6. A liquid crystal display device according to claim 5, wherein a film having anisotropic indices of refraction in the plane of the film and a film having isotropic indices of refraction in the plane of the film and anisotropic indices of refraction in the perpendicular direction to the plane of the film are arranged between the polarizer and the analyzer.

7. A liquid crystal display device according to claim 6, wherein the film having anisotropic indices of refraction in the plane of the film is a uniaxially oriented phase film.

8. A liquid crystal display device according to claim 7, wherein the uniaxially oriented phase film has an axis of orientation which coincides with optical axes of one of the polarizer and the analyzer.

9. A liquid crystal display device manufacturing method comprising the steps of:
   bonding first and second plates to a peripheral seal extending along a periphery of a gap between the first and second plates, one of the first and second plates having a shading layer arranged therein, the peripheral seal being discontinuous such that a discontinuity in the peripheral seal defines a passageway into the gap between first and second plates;
   inserting a mixture of light curable resin material and a liquid crystal material through the passageway and into the gap between the first and second plates; and
   irradiating light obliquely to a surface of the plate having the shading layer for curing the resin material in the mixture, the curing of the resin material accompanying a phase separation between the cured resin material and the liquid crystal material, whereby the liquid crystal material capsulizes and disperses substantially uniformly throughout the cured resin material.

10. A liquid crystal display device manufacturing method according to claim 9, wherein in the step of irradiating light to the plate having the shading layer, a supplemental transparent plate is superposed on the surface of the plate having the shading layer, and the light is caused to be incident obliquely to an end surface of the supplemental transparent plate, to thereby apply the light to the surface of the plate having the shading layer from a direction oblique to the surface of the plate having the shading layer.

11. A liquid crystal display device manufacturing method according to claim 10, wherein the supplemental transparent plate is thicker than the plate having the shading layer.

12. A liquid crystal display device manufacturing method according to claim 10, wherein in the step of irradiating light to the plate having the shading layer, a liquid or paste material having a greater index of refraction than that of air is inserted between the plate having the shading layer and the supplemental transparent plate.

13. A liquid crystal display device manufacturing method according to claim 12, wherein the liquid or paste material having a greater index of refraction than that of air comprises oil.

14. A liquid crystal display device manufacturing method according to claim 9, wherein in the step of irradiating light to the plate having the shading layer, the light is applied to the plate having the shading layer from at least two directions.

15. A liquid crystal display device manufacturing method according to claim 9, wherein he light curable resin in the mixture of light curable resin material and the liquid crystal material is curable by a light having a first wavelength, and the manufacturing method further comprising the steps of:

pressing together the first and second plates to a predetermined distance therebetween after inserting through the passageway the mixture of light curable resin material and the liquid crystal material;

closing the passageway with a plug of a supplemental light curable resin material, the supplemental light curable resin being curable by light having a second wavelength, the second wavelength being different than the first wavelength; and before the step of irradiating light to the plate having the shading layer, irradiating light having the second wavelength to the plug in the passageway to cure the plug.

16. A liquid crystal display device manufacturing method according to claim 9, wherein the passageway is closed by a plug of a supplemental light curable resin material, the supplemental light curable resin material is curable by a visible light, and the light curable resin in the mixture of light curable resin material and the liquid crystal material is curable by an ultraviolet light.

17. A liquid crystal display device produced by a process comprising the steps of:

providing first and second plates each having transparent electrode means;

bonding the first and second plates to a peripheral seal extending along a periphery of a gap between the first and second plates, one of the first and second plates having a shading layer arranged therein, the peripheral seal being discontinuous such that a discontinuity in the peripheral seal defines a passageway into the gap between first and second plates;

inserting a mixture of light curable resin material and a liquid crystal material through the passageway and into the gap between the first and second plates; and irradiating light obliquely to a surface of plate having a shading layer for curing the resin material in the mixture, the curing of the resin material accompanying a phase separation between the cured resin material and the liquid crystal material, whereby the liquid crystal material capsulizes and disperses substantially uniformly throughout the cured resin material.

* * * * *